May 23, 1961 V. F. JANONIS 2,985,767

LINEAR-BISTABLE MAGNETIC AMPLIFIER

Filed June 24, 1957

2 Sheets-Sheet 1

WITNESSES

Edwin E. Bassler

Myron E. Click

INVENTOR

Vytautas F. Janonis

BY F. E. Browder

ATTORNEY

May 23, 1961 V. F. JANONIS 2,985,767

LINEAR-BISTABLE MAGNETIC AMPLIFIER

Filed June 24, 1957

2 Sheets-Sheet 2

United States Patent Office 2,985,767

Patented May 23, 1961

2,985,767

LINEAR-BISTABLE MAGNETIC AMPLIFIER

Vytautas F. Janonis, Pittsburgh, Pa., assignor to Westinghouse Electric Corporation, East Pittsburgh, Pa., a corporation of Pennsylvania Filed June 24, 1957, Ser. No. 667,651

9 Claims. (Cl. 307—88)

This invention relates to magnetic amplifiers in general and in particular to magnetic amplifiers possessing both linear and bistable characteristics.

Linear and bistable magnetic amplifiers have found many applications in modern control techniques because of their inherent reliability. In some applications, however, it would be desirable to have a single magnetic amplifier that would perform in both a linear and a bistable mode depending upon the magnitude of an input signal. An example of this type of application would be in home heating. Signals from a thermostat through a linear-bistable magnetic amplifier would turn a heating unit on at a low temperature level, linearly regulate the amount of heat supplied over a predetermined range, i.e., supplying room losses, and shut the heating unit off when a higher temperature level is reached.

It is, accordingly, an object of this invention to provide an improved magnetic amplifier.

It is another object of this invention to provide an improved magnetic amplifier having a combined linear and bistable transfer characteristic.

Further objects of this invention will be apparent from the following description when taken in conjunction with the accompanying drawings. In said drawings, for illustrative purposes only, are shown preferred forms of the invention.

Figure 1:
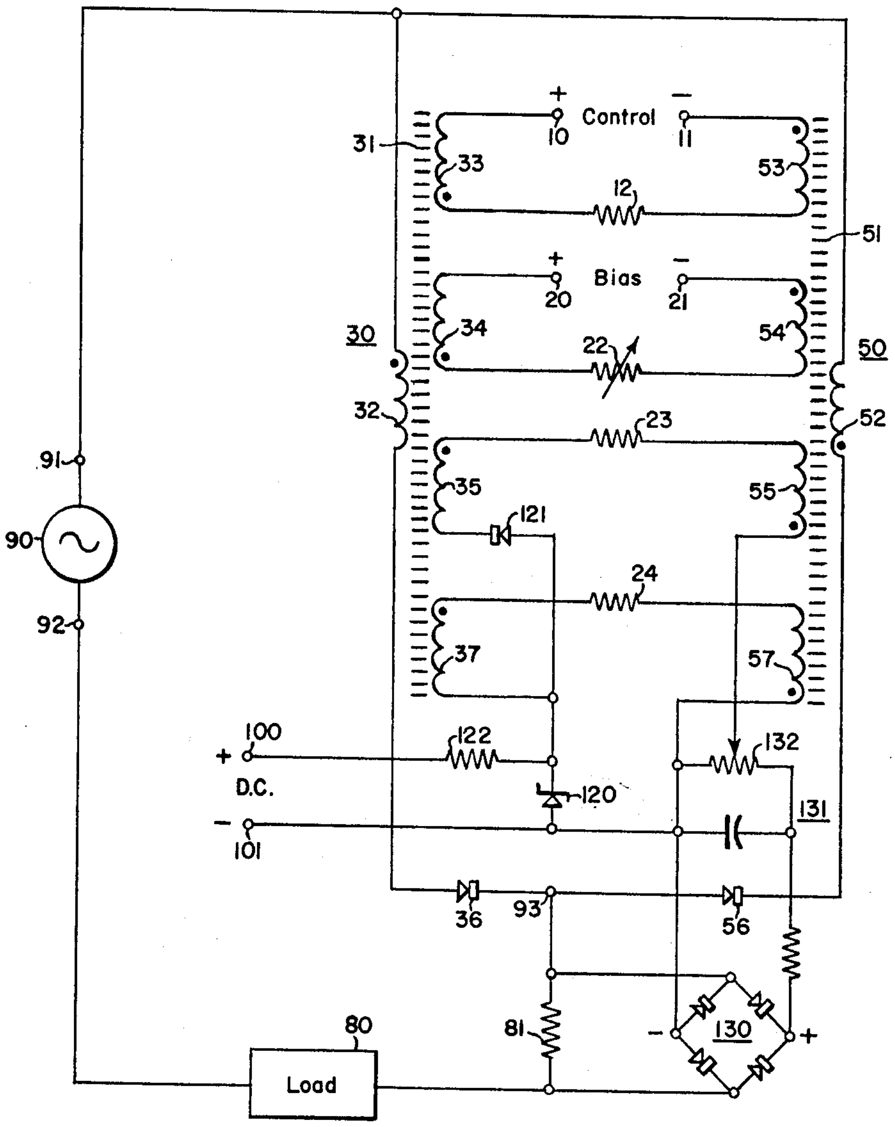
Figure 1 is a schematic diagram of a linear-bistable magnetic amplifier embodying the teachings of this invention.

In Fig. 1 the manner in which the windings have been wound on the magnetic core members has been denoted by the polarity dot convention indicating like points of instantaneous polarity. The polarity dot convention denotes direction of saturation. That is, current flowing into the polarity dot end of a winding will drive the inductively associated core toward positive saturation. Current flowing out of the polarity dot end of a winding will drive the inductively associated core away from positive saturation.

Referring to Fig. 1, there is illustrated a linear-bistable magnetic amplifier embodying the teachings of this invention. In general, the apparatus illustrated in Fig. 1 comprises a pair of saturable reactors 30 and 50 connected as a conventional, self-saturating, "doubler" magnetic amplifier. In addition to the conventional flux regulating means of control and bias windings, the embodiment illustrated in Fig. 1 has a load current sensing means, voltage reference means and feedback means.

The saturable reactor 30 comprises a magnetic core member 31 having inductively disposed thereon, a load winding 32, a control winding 33, a bias winding 34 and a feedback winding 35. The reactor 50 comprises a magnetic core member 51 having inductively disposed thereon a load winding 52, a control winding 53, a bias winding 54 and a feedback winding 55. The load winding 32 and a rectifier 36 are connected in parallel circuit relationship with the load winding 52 and a rectifier 56 between the terminals 91 and 93. A resistor 81, and a load 80 are connected in series circuit relationship between the terminals 93 and 92. An alternating current voltage source 90 is connected to the terminals 91 and 92.

The control circuit includes the control winding 33 of the reactor 30, a resistor 12 and the load winding 53 of the reactor 50 connected in series circuit relationship between the terminals 10 and 11. The bias circuit includes the bias winding 34 of the reactor 30, an adjustable resistor 22 and the bias winding 54 of the saturable reactor 50 connected in series circuit relationship between the terminals 20 and 21.

The load current sensing means comprises a full-wave rectifier 130 connected across the resistor 81 with an adjustable tapped resistor 132 connected across the output terminals of the full-wave rectifier 130. Filter means such as the R-C filter 131 may be connected across the output of the full-wave rectifier 130 to filter out the ripple. The voltage reference means comprises a source of direct current, not shown, which is to be connected to the terminals 100 and 101 and a resistor 122 and a Zener type semiconductor diode 120 connected in series between the terminals 100 and 101. The negative terminal 101 is to be connected to the negative terminal of the full-wave rectifier 130. The feedback means comprises a rectifier 121, the feedback winding 35 of the reactor 30, a resistor 23 and the feedback winding 55 of the reactor 50 connected in series circuit relationship between the junction of the resistor 122 and the semiconductor diode 120 and the adjustable tapped restistor 132.

The operation of the conventional full-wave self-saturating "doubler" is well-known in the art of magnetic amplifiers. On the first half-cycle of the alternating current voltage source 90, when the terminal 91 is at a positive polarity with respect to the terminal 92, current will flow from the terminal 91 through the load winding 32 of the saturable reactor 30, the rectifier 36, the terminal 93, the resistor 81 and the load 80 to the terminal 92. On the next half-cycle, when the terminal 92 is at a positive polarity with respect to the terminal 91, current will flow from the terminal 92 through the load 80, the resistor 81, the terminal 93, the rectifier 56 and the load winding 52 of the reactor 50 to the terminal 91.

Figure 2:
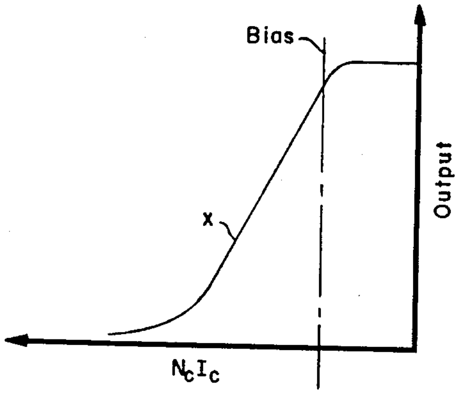
Fig. 2 is a graphical representation of a transfer characteristic of a conventional magnetic amplifier whose output is proportional to its input.

The transfer characteristic for a conventional "doubler" is graphically represented in Fig. 2 where the control ampere-turns are plotted as a function of the output voltage. The "doubler" may be biased to operate at any point along the curve X of Fig. 2. The bias circuit connected to the terminals 20 and 21 having a direct current source, not shown, with polarity as shown in Fig. 1, will drive the reactors 30 and 50 towards positive saturation allowing an output from a certain point on the transfer characteristic. The control circuit having a direct current input signal, with polarity as shown, at the terminals 10 and 11 will drive the reactors 30 and 50 away from positive saturation and back down the transfer characteristic curve X to some lower point. Thus, it can be seen that the bias circuit may set any operating point on the curve X allowing a predetermined amount of output with zero control signal and the magnitude of the control signal applied to the control circuit determines the actual amount of output from the reactors 30 and 50 for any particular half-cycle.

In the apparatus illustrated in Fig. 1, the magnetic amplifier has been biased up to the linear region by the bias circuit so that the output to the load 80 will be inversely proportional to the applied input control ampere-turns.

Figure 3:
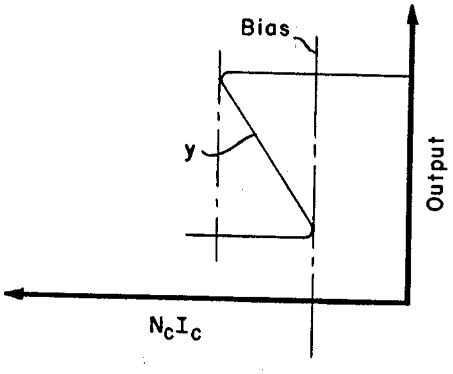
Fig. 3 is a graphical representation of a transfer characteristic of a conventional bistable magnetic amplifier.

The transfer characteristic of a conventional bistable magnetic amplifier is illustrated in Fig. 3 where the output voltage is plotted as a function of the control ampere-turns. The bistable effect is most usually obtained by the use of regenerative feedback in a magnetic amplifier.

The voltage reference circuit means operates by utilizing the breakdown characteristics of the semiconductor diode 120. That is, current will flow from the terminal 100 through the resistor 122, the semiconductor diode 120 in the reverse direction to the terminal 101. The magnitude of the direct current voltage applied to the terminals 100 and 101 is larger than the breakdown voltage of the semiconductor diode 120. The load current sensing means operates by rectifying the voltage developed across the resistor 81 and current will flow through the resistor 132 from the positive side of the full-wave rectifier 130 to the negative side. As hereinbefore stated, a ripple filter 131 may be added to smooth out the current obtained from the full-wave rectifier 130.

Figure 4:
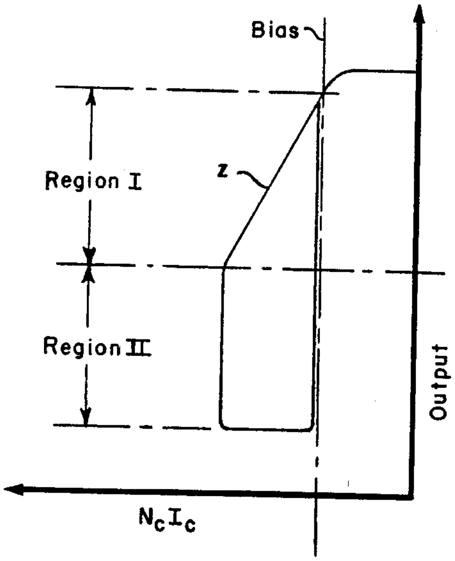
Fig. 4 is a graphical representation of a transfer characteristic of the apparatus illustrated in Fig. 1.

The magnetic amplifier illustrated in Fig. 1 is biased to the linear region as hereinbefore described and will operate on this linear region until the control ampere-turns reaches a certain input level. This portion of operation is denoted as Region I of the curve Z of the transfer characteristic for the linear-bistable magnetic amplifier illustrated in Fig. 4. As soon as the control ampere-turns are high enough to diminish the average load current through the resistor 81 to a point where the direct-current voltage proportional to the load current as obtained from the full-wave rectifier 130 is smaller than the reference voltage developed across the semiconductor diode 120, the rectifier 121 will start to conduct. Current will flow from the reference voltage through the rectifier 121, the feedback winding 35 of the reactor 30, the resistor 23, the feedback winding 55 of the reactor 50 and a portion of the adjustable tapped resistor 132. The transition from the Region I hereinbefore mentioned to the bistable Region II of the curve Z as illustrated in Fig. 4 now starts. It can be seen that once the sensing voltage proportional to the load current is smaller than the reference voltage supplied across the semiconductor diode 120 that a current will flow through the feedback windings 35 and 55 of the reactor 30 and 50, respectively, and will drive the reactors 30 and 50 further from positive saturation.

The driving of the reactors 30 and 50 further from positive saturation will, in turn, diminish the value of the load current through the resistor 80 which again, in turn, increases the flow of current through the feedback windings 35 and 55, driving the reactors further from positive saturation. Once the transition from Region I to Region II starts the action is self-supporting and switching between the regions is unavoidable.

As may be seen in Fig. 4 to close the cycle of the curve Z, the control ampere-turns must rise to the full input level before the linear-bistable magnetic amplifier will switch back from the Region II to the Region I. Again the switching action from the Region II to the Region I is self-supporting once started and transition becomes unavoidable at a certain control ampere-turn level.

The tapped adjustable resistor 132 is made adjustable so that the breakdown voltage of the semiconductor diode 120 may be matched since it is practically impossible to obtain identical components from shelf stock items. The size of the resistor 23 varies two characteristics of the linear-bistable magnetic amplifier. A smaller value of resistance for the resistor 23 will give a wider bistable loop. On the other hand, the switching time will also be smaller as the resistance of the resistor 23 is made smaller. Thus, the resistor 23 may be adjusted to the size desired for the particular quantities needed for various applications. The full-wave rectifier 130 may be connected directly across the load 80 if the load 80 is not inductive.

In some applications where a constant voltage source is not available there may be included in flux-regulating winding means of the magnetic amplifier illustrated in Fig. 1 means for compensating for line voltage variations. This compensating means comprises two fixed bias windings 37 and 57 inductively disposed on the magnetic core members 31 and 51 of the saturable reactors 30 and 50, respectively. The windings 37 and 57 and a resistor 24 are connected in series circuit relationship across the semiconductor diode 120.

By connecting the windings 37 and 57 across the voltage reference semiconductor 120 a fixed bias is obtained for the reactors, the amount of the current flow being regulated by the resistor 24. The direction of saturation, is denoted in Fig. 1 by the polarity dot, for the windings 37 and 57 is away from positive saturation. This is merely illustrative, however, since the purpose of the fixed bias windings 37 and 57 is to set some base level of saturation for the magnetic core members 31 and 51. The bias circuit connected to the terminals 20 and 21 will be connected to derive its direct current from the alternating current voltage source 90 by some suitable means such as a full-wave rectifier. Therefore, when the line voltage of the source 90 varies the amount of direct current supplied to the terminals 20 and 21 will also vary proportionally.

When the line voltage supplying a magnetic amplifier varies it will vary the transfer characteristic of that magnetic amplifier. With the compensating means of this invention, when the line voltage changes a certain percentage it will change the overall bias of the magnetic amplifier the percentage necessary to operate on the new transfer characteristic of the new line voltage thus maintaining a constant output for the magnetic amplifier for a given constant input signal to the terminals 10 and 11.

In conclusion, it is pointed out that while the illustrated example constitutes a practical embodiment of my invention, I do not limit myself to the exact details shown, since modification of the same may be varied without departing from the spirit of this invention.

I claim as my invention:

1. In a linear bistable magnetic amplifier, in combination, a pair of saturable magnetic cores having inductively disposed thereon load winding means, flux regulating winding means and feedback winding means; means for applying an alternating current voltage to said load winding means whereby said magnetic cores are alternately driven toward saturation; means for connecting a load to said load winding means; voltage reference means and load current sensing means each having an output connected in electrical opposition across said feedback winding means; and feedback circuit means for allowing current through said feedback winding means when a predetermined load current level is sensed by said load current sensing means.

2. In a linear bistable magnetic amplifier, in combination, a pair of saturable magnetic cores having inductively disposed thereon load winding means, flux regulating winding means and feedback winding means; means for applying an alternating current voltage to said load winding means whereby said magnetic cores are alternately driven toward saturation; means for connecting a load to said load winding means; voltage reference means and load current sensing means each having an output connected in electrical opposition across said feedback winding means; and feedback circuit means for allowing current through said feedback winding means when a predetermined relationship between each said output exists.

3. In a linear bistable magnetic amplifier, in combination, a pair of saturable magnetic cores having inductively disposed thereon load winding means, flux regulating winding means and feedback winding means; means for applying an alternating current voltage to said load winding means whereby said magnetic cores are alternately driven toward saturation; means for connecting a load to said load winding means; voltage reference means and load current sensing means each having an output connected in electrical opposition across said feedback winding means; and feedback circuit means for allowing current through said feedback winding means when the output of said reference means exceeds the output of said load current sensing means.

4. In a linear bistable magnetic amplifier, in combination, a pair of saturable magnetic cores having inductively disposed thereon load winding means, flux regulating winding means and feedback winding means; means for applying an alternating current voltage to said load winding means whereby said magnetic cores are alternately driven toward saturation; means for connecting a load to said load winding means; voltage reference means and load current sensing means each having an output connected in electrical opposition across said feedback winding means; and feedback circuit means for allowing current through said feedback winding means when a predetermined relationship between each said output exists; said voltage reference means including a Zener diode and a direct current source of sufficient magnitude operatively connected to break down said diode, the Zener break down voltage level of said diode determining the magnitude of output from said voltage reference means.

5. A magnetic amplifier comprising; saturable means having inductively disposed thereon load winding means and feedback winding means; means for connecting a supply voltage to said load winding means; means for connecting a load to said load winding means; a voltage reference means and load current sensing means each having an output connected in electrical opposition across said feedback winding means; and feedback circuit means for allowing a predetermined value of output from said load sensing means to block the application of the output from said voltage reference means across said feedback winding means.

6. A magnetic amplifier comprising; saturable means having inductively disposed thereon load winding means and feedback winding means; means for connecting a supply voltage to said load winding means; means for connecting a load to said load winding means; a voltage reference means and load current sensing means each having an output connected in electrical opposition across said feedback winding means; and feedback circuit means for allowing a predetermined value of output from said load sensing means to block the application of the output from said voltage reference means across said feedback winding means; and control winding means inductively disposed on said saturable means and responsive to a predetermined magnitude of control voltage for reducing the output of said load sensing means to a magnitude less than that necessary to block the application of the output from said voltage reference means across said feedback winding means.

7. A magnetic amplifier comprising; saturable means having inductively disposed thereon load winding means and feedback winding means; means for connecting a supply voltage to said load winding means; means for connecting a load to said load winding means; a voltage reference means and load current sensing means each having an output connected in electrical opposition across said feedback winding means; and feedback circuit means for allowing a predetermined value of output from said load sensing means to block the application of the output from said voltage reference means across said feedback winding means; and control winding means inductively disposed on said saturable means and responsive to a predetermined magnitude of control voltage for reducing the output of said load sensing means to a magnitude less than that necessary to block the application of the output from said voltage reference means across said feedback winding means; said magnetic amplifier having a substantally linear output in response to magnitudes of control voltage less than said predetermined magnitude of control voltage.

8. A magnetic amplifier comprising; saturable means having inductively disposed thereon load winding means and feedback winding means; means for connecting a supply voltage to said load winding means; means for connecting a load to said load winding means; a voltage reference means and load current sensing means each having an output connected in electrical opposition across said feedback winding means; and feedback circuit means for allowing a predetermined value of output from said load sensing means to block the application of the output from said voltage reference means across said feedback winding means; and control winding means inductively disposed on said saturable means and responsive to a predetermined magnitude of control voltage for reducing the output of said load sensing means to a magntude less than that necessary to block the application of the output from said voltage reference means across said feedback winding means; said magnetic amplifier having a substantially linear output in response to magnitudes of control voltage less than said predetermined magnitude of control voltage and having a switching action in the output of said magnetic amplifier when the magnitude of said control voltage is at least equal to said predetermined magnitude of said control voltage.

9. A magnetic amplifier comprising, saturable means having inductively disposed thereon load winding means and feedback winding means; means for connecting a supply voltage to said load winding means; means for connecting a load to said load winding means; a voltage reference means and load current sensing means each having an output connected in electrical opposition across said feedback winding means; and feedback circuit means for allowing a predetermined magnitude of one of said outputs to block the application of the other said outputs across said feedback winding means.

References Cited in the file of this patent

UNITED STATES PATENTS

| | | |
|---|---|---|
| 2,731,203 | Miles | Jan. 17, 1956 |
| 2,774,930 | Bixby | Dec. 18, 1956 |
| 2,786,177 | Werner | Mar. 19, 1957 |
| 2,812,449 | Spencer et al. | Nov. 5, 1957 |